United States Patent [19]

Kalvinskas et al.

[11] 4,209,393
[45] Jun. 24, 1980

[54] SEWAGE SLUDGE ADDITIVE

[75] Inventors: John J. Kalvinskas, Pasadena; William A. Mueller, Glendale; John D. Ingham, La Crescenta, all of Calif.

[73] Assignee: California Institute of Technology, Pasadena, Calif.

[21] Appl. No.: 652,979

[22] Filed: Jan. 28, 1976

[51] Int. Cl.² ................................. C02B 1/14
[52] U.S. Cl. ...................... 210/40; 252/422
[58] Field of Search ................ 210/40, 39, 32, 18, 210/10, 67, 68; 252/421–423; 201/21, 24

[56] References Cited

U.S. PATENT DOCUMENTS

| | | | |
|---|---|---|---|
| 1,915,240 | 6/1933 | Putnam | 210/68 |
| 3,244,621 | 4/1966 | Bouthilet | 210/40 |
| 3,424,676 | 1/1969 | Johnson et al. | 210/40 |
| 3,763,040 | 10/1973 | Timpe et al. | 210/40 |
| 3,767,570 | 10/1973 | Clapp | 210/40 |
| 3,887,461 | 6/1975 | Nickerson et al. | 210/39 |
| 3,892,661 | 7/1975 | Siviour et al. | 210/40 |
| 3,948,791 | 4/1976 | Tominaga et al. | 210/40 |

*Primary Examiner*—Benoit Castel
*Attorney, Agent, or Firm*—Freilich, Hornbaker, Wasserman, Rosen & Fernandez

[57] ABSTRACT

In a raw sewage treatment process of the type where settling tanks are used for the purpose of permitting the suspended matter in the raw sewage to be settled as well as to permit adsorption of the dissolved contaminants in the water of the sewage. The sludge, which settles down to the bottom of the settling tank is extracted, pyrolyzed and activated to form activated carbon and ash which is mixed with the sewage prior to its introduction into the settling tank, for the purposes mentioned. Because the sludge does not provide all of the activated carbon and ash required for adequate treatment of the raw sewage, it is necessary to add carbon to the process. In accordance with this invention, instead of expensive commercial carbon, coal is used to provide the carbon supplement.

3 Claims, No Drawings

SEWAGE SLUDGE ADDITIVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to an improved method and means for treating raw liquid waste, such as sewage.

One of the present day techniques for treating liquid wastes such as sewage which comprises water, contaminated by organic and inorganic matter which is dissolved in the water as well as organic and inorganic matter which is suspended in the water, is to mix a material, such as activated carbon or activated carbon and ash with the raw sewage in a contactor and the mixture is then transferred to a settling tank to permit adsorption of the dissolved polluting material and settling of the suspended polluting material. The suspended matter, which settles to the bottom of the settling tank, is called sludge, and contains sewage carbon. The sludge is transferred to a filter where it is dewatered and the cakes of dried sludge are then transferred to a pyrolyzing oven where the sewage carbon is converted to elemental carbon which is activated. The output of the pyrolyzer, comprising activated carbon and ash is dumped into the contactor to be mixed with the incoming sewage.

It has been found that the system described does not produce enough activated carbon to make the system self-sustaining. Consequently it has been necessary to provide commercial activated carbon to make up the deficiency. However, it has been found that commercial carbon required for this purpose is quite expensive.

OBJECTS AND SUMMARY OF THE INVENTION

An object of this invention is to provide a relatively inexpensive supplemental source of carbon for use in treating sludge.

Another object of this invention is the provision of a novel and useful source for activated carbon for use in a sewage treatment plant.

The foregoing and other objects of the invention may be achieved by mixing coal, and preferably the coal known as lignite with sewage sludge for the purpose of providing supplemental activated carbon. While the coal alone can be pyrolyzed to form activated carbon and ash, which thereafter can be mixed with the raw sewage in the contactor, it has been found that when coal is mixed with sewage sludge and pyrolyzed the sewage sludge acts as a catalyst in the activation process. Also, a mixture of lignite with sodium carbonate can be pyrolyzed to provide activated carbon and ash. The mixture of the coal with the raw sewage or of the lignite with the sodium carbonate provides a much higher activation than achievable when lignite alone is pyrolyzed under the same conditions. Finally, in the course of the pyrolysis the coal provides flammable volatiles or gases suitable for use in the required heating and thus can supply part of the energy required.

DESCRIPTION OF THE PREFERRED EMBODIMENTS

Commercially purchasable activated carbon costs on the order of 30 to 80 cents per pound, whereas coal costs one to four cents per pound. Therefore, if the quantity of coal required to produce an equivalent amount of activated carbon is not too high, and the energy required for the pyrolization process is not excessive, considerable cost savings may be made.

To determine whether or not the use of a mixture of coal and sewage sludge to produce activated carbon is economically feasible, in one set of experiments, 2 gram samples were put in a ceramic boat which was placed into a quartz tube. The tube which was about 2.5 cm, i.d. was inserted into the furnace and gas, (N2) was made to flow through the furnace at 150 ml/min. As shown in Table 1 below, which shows the results of pyrolysis, the samples were sewage sludge, Nuchar (a commercially purchaseable carbon), coal, (bituminous) Nuchar and sewage sludge, and coal sewage sludge. The coal used was not lignite.

TABLE 1

| | PYROLYSIS IN NITROGEN[a] AT 700° C. | | | | |
|---|---|---|---|---|---|
| Sample No. | Composition | Wt % | Char + Ash, Wt % | Ash in Char, Wt % | Char,[b] Wt % | Ash[b] Wt % |
| 1[c] | S.S. | 100 | 34.9 | 68.4 | 11.0 | 24.5 |
| 2 | Nuchar | 100 | 80.6 | 2.3 | 78.7 | 1.9 |
| 3 | Coal | 100 | 58.4 | 7.8 | 53.8 | 4.6 |
| 4 | Nuchar S.S. | 33 67 | 51.9 | 34.9 | 33.8 | 18.1 |
| 5 | Nuchar S.S. | 40 60 | 55.6 | 29.4 | 39.3 | 16.3 |
| 6 | Nuchar S.S. | 50 50 | 59.9 | 23.2 | 46.0 | 13.9 |
| 7 | Nuchar S.S. | 57 43 | 65.1 | 18.8 | 52.9 | 12.2 |
| 8 | Coal S.S. | 33 67 | 42.4 | 44.4 | 23.6 | 18.8 |
| 9 | Coal S.S. | 40 60 | 43.6 | 37.3 | 27.3 | 16.3 |
| 10 | Coal S.S. | 50 50 | 46.6 | 31.8 | 31.8 | 14.8 |
| 11 | Coal S.S. | 57 43 | 47.3 | 26.5 | 34.8 | 12.5 |

[a]Nitrogen flow rate 150 ml/min; 1 inch quartz tube; temperature: 700°; duration: 30 min; sample weights: 2g
[b]These values are wt % of initial sample weights.
[c]Heated for 10 minutes; a second sample heated for 30 min gave approximately the same results, i.e., 10.2 and 24.5 wt % char and ash, respectively.
[d]Values are averages of three runs that agreed within ± 1.3 wt % or less Table 2 shows the results of pyrolysis using coal and sewage sludge samples, where the gas used was carbon monoxide.

TABLE 2

| | PYROLYSIS IN CARBON MONOXIDE AT 700° C. | | | | | |
|---|---|---|---|---|---|---|
| Sample No. | Composition | Wt % | Char + Ash, Wt % | Ash in Char, Wt % | Char, Wt % | Ash Wt % |
| 1 | S.S. | 100 | 35.3 | 67.5 | 11.5 | 23.8 |
| 2 | Coal S.S. | 25 75 | 41.0 | 47.9 | 21.4 | 19.6 |
| 3 | Coal S.S. | 33 67 | 42.8 | 43.4 | 24.2 | 18.6 |
| 4 | Coal S.S. | 50 50 | 47.2 | 30.5 | 32.8 | 14.4 |

Because of the large gas volume to solids ratio a significant amount of organic char or tar was evolved that coated the tube walls. This material was not included in the char yield and was a factor that contributed to low yields. However, from the foregoing it can be seen that about 1.3 times the weight of coal can be added to the sewage sludge in place of activated carbon to give the same char to ash ratio as the activated carbon, at a considerable cost savings. The temperature required to effectuate pyrolysis when coal and sludge is used on the same order as that required when activated carbon and sludge is used. Since the coal being pyrolyzed gives off flammable gases, there can be a further savings in the energy required to be used for the pyrolization process.

Lignite coal is a specific type of coal whose composition is exemplified in a publication by the United States Department of the Interior, Bureau of Mines dated Feb. 6, 1973, Test Number 73-76. As previously set forth, either for the purpose of supplementing the activated carbon derived from sewage sludge or for providing the activated carbon requirements for a sewage processing plant, lignite coal may be used. Lignite is the cheapest coal and thus much cheaper than commercial carbon which is normally used for this purpose. The coal is pulverized to preferably −40 mesh and in that form, mixed with dried sewage sludge and provided to the pyrolyzing furnace. Where the sewage treatment plant uses more than one tank for settling and for adsorption processes, and where it is desired to add activated carbon to each one of these tanks, the output of the pyrolyzer may be supplied to each one of these tanks.

On a laboratory scale, in which pyrolysis and activation tests were conducted, the pyrolysis and activation conditions were set at 850° C., and steam was applied over an interval from between 20–40 minutes at the rate of 0.6 grams per minute. The charge of coal was 11½ to 12 grams. Pyrolysis and activation tests were conducted for lignite, bituminous, and sub-bituminous coal. As a result, lignite appeared to be more readily activated than either the sub-bituminous coal or bituminous coal. Lignite carbon activation tests showed from 345–1154 mg/gram iodine adsorption. The higher activation reflected longer activation times.

Pyrolysis activation of lignite in conjunction with sewage, in even proportions, proved to be even more beneficial. This mixture was pyrolyzed at 850° C. and steam activated for 20 minutes with 0.6 g/min. steam. The resulting activated carbon was 61.7% ash. An activation test showed iodine adsorption of 684 mg/g of carbon. A raw sewage sludge sample [chemical oxygen demand (COD) equal to 421] treated with 521 mg/l of the resulting carbon gave a COD value of 59. Another raw sewage sludge sample (COD equal to 421) was treated with a commercial carbon known as Aqua Nuchar, which gave a COD value of 60.

A sample of lignite with 5% sodium carbonate was pyrolyzed at 850° C. for 20 minutes and 0.60 g/min. steam was used for activation. This produced an ash of 31.8% and iodine adsorption of 820.6 mg/g from carbon indicated a high activation. The raw sewage treatment test of 500 mg/l produced a COD of 50 mg/l.

Apparently the presence of either the sewage sludge or the sodium carbonate appeared to be beneficial to the activation of lignite. Coal or lignite in the proportions of 95 to 5% can be mixed with from 5 to 95% of sewage sludge in accordance with this invention. Further, lignite mixed with up to 25% $Na_2Co_3$ can be used as a source of activated carbon. If desired it can also be mixed with the sewage sludge before pyrolysis. There will be found below a table which illustrates the comparative results of coal pyrolysis activation which were obtained. This table clearly shows that lignite coal either alone or mixed with sewage sludge or sodium carbonate provides a product having much higher activation than sub-bituminous coal and bituminous coal.

TABLE 3

COAL PYROLYSIS AND ACTIVATION
(1-inch Diameter Quartz Tube, Muffle Furnace, Charge[1] 11.5–12 grams)

| Coal | Activated Carbon Product | | | |
|---|---|---|---|---|
| | Ash (wt. %) | Carbon Yield[2] (%) | Activation Iodine Absorption (mg/gram carbon) | COD[3] (mg/l) |
| Conditions: 850° C., 20 minutes activation, steam @ 0.6 grams/min. | | | | |
| Lignite[4] | 21.8 | 27.0 | 345 | |
| Lignite[4] | 23.0 | 34.0 | 499 | |
| SubBituminous[5] | 9 | 37.0 | 281 | |
| Bituminous[6] | 23.0 | 38.0 | 210 | |
| Lignite[4] + 50% Sewage | 61.7 | 14.1 | 684 | 59(60) |
| Lignite[4] + 5% $Na_2CO_3$ | 31.8 | 21.8 | 821 | 50(60) |
| Conditions: 850° C., 40 minute activation, steam @ 0.6 grams/min. | | | | |
| Lignite[4] | 60.6 | 15.0 | 1154 | |
| Lignite[4] | 34.5 | 34.0 | 492 | |
| SubBituminous[5] | 21.0 | 15.0 | 327 | |
| Bituminous[6] | 25.0 | 36.0 | 425 | |

[1]Charge in Quartz tube, - 100 mesh, dried, 11.5-12 grams
[2]Yield = (grams CARBON/gram DRIED LIGNITE) × 100
[3]Residual COD (Raw COD = 421) after treatment with 500 mg/l carbon (Aqua Nuchar)
[4]U.S. Bureau of Mines Report - Vol. Matter 42.27% fixed carbon 47.86% Ash 9.87%.
[5]U.S. Bureau of MInes Report - Vol. Matter 40.84% fixed carbon 53.50% Ash 5.66%
[6]U.S. Bureau of Mines Report - Vol. Matter 40.34%, fixed carbon 47.42% Ash 12.24%

The reasons why lignite coal is superior to other forms of coal for the process described is not known, but it is supposed that this may be due to the geological formation of lignite coal. The iodine absorption number shown in Table 3 is a measure of activation. The higher the number, the better the capability of the activated carbon for adsorption of sewage contaminants. As previously stated another important advantage in using lignite coal as a supplemental source of carbon is that in the course of its pyrolysis sufficient flammable gases are generated which can be burned in the heating process and thus some energy conservation is also provided.

There has accordingly been described and shown above a novel and inexpensive source of activated carbon which can be used in processing raw wastes.

We claim:

1. In a sewage treatment process of the type wherein the raw sewage is mixed with activated carbon for the purpose of absorption of dissolved contaminants in the sewage water and/or settling the settleable matter therein as sewage sludge, said sewage sludge thereafter being pyrolyzed to provide said activated carbon, the improved method of obtaining adequate activated carbon for mixing with said raw sewage comprising the steps of:

mixing said sewage sludge with coal to produce a mixture, wherein said coal is lignite, pryolyzing said mixture to provide activated carbon, mixing said activated carbon with said raw sewage, and mixing from 1 to 25% sodium carbonate with 99 to 75% of lignite.

2. In a sewage treatment process of the type wherein the raw sewage is mixed with activated carbon for the purpose of adsorption of dissolved contaminants in the sewage water and/or settling the settleable matter therein as sewage sludge, said sewage sludge then being pyrolyzed to provide said activated carbon, the improved method for producing said activated carbon comprising:

mixing from 1 to 25% of sodium carbonate and from 99 to 75% of lignite coal, to produce a first mixture, mixing said mixture with said sewage sludge to produce a second mixture, pyrolyzing said second mixture to produce said activated carbon.

3. In a sewage treatment process of the type wherein raw sewage is mixed with activated carbon and ash and then is transferred to a settling tank to permit adsorption of impurities in the sewage water by said activated carbon and ash and to permit settling of settleable suspended matter in said sewage to form a sludge at the bottom of said container, a method of producing activated carbon and ash for said sewage treatment comprising mixing from 75 to 99% of lignite coal, with from 25 to 1% of sodium carbonate, and pyrolyzing and activating said mixture to form activated carbon and ash.

* * * * *

UNITED STATES PATENT AND TRADEMARK OFFICE
CERTIFICATE OF CORRECTION

PATENT NO. : 4,209,393

DATED : June 24, 1980

INVENTOR(S) : John J. Kalvinskas et al.

It is certified that error appears in the above—identified patent and that said Letters Patent is hereby corrected as shown below:

Column 5, line 1, "absorption" should read -- adsorption --.

Signed and Sealed this

Tenth Day of March 1981

[SEAL]

Attest:

RENE D. TEGTMEYER

Attesting Officer

Acting Commissioner of Patents and Trademarks